United States Patent
Bruckmann et al.

(10) Patent No.: US 7,394,627 B2
(45) Date of Patent: Jul. 1, 2008

(54) FREQUENCY CONVERTER HAVING AN INTERMEDIATE CIRCUIT WITHOUT ANY CAPACITORS

(75) Inventors: Manfred Bruckmann, Nürnberg (DE); Hubert Schierling, Erlangen (DE)

(73) Assignee: Siemens Aktiengesellschaft, München (DE)

( * ) Notice: Subject to any disclaimer, the term of this patent is extended or adjusted under 35 U.S.C. 154(b) by 0 days.

(21) Appl. No.: 11/625,526

(22) Filed: Jan. 22, 2007

(65) Prior Publication Data

US 2007/0177407 A1  Aug. 2, 2007

Related U.S. Application Data

(63) Continuation of application No. PCT/EP2005/053502, filed on Jul. 20, 2005.

(30) Foreign Application Priority Data

Jul. 23, 2004  (DE) .......................  10 2004 035 799

(51) Int. Cl.
*H02H 7/00* (2006.01)
(52) U.S. Cl. ..................................... 361/18
(58) Field of Classification Search ............... 361/18
See application file for complete search history.

(56) References Cited

U.S. PATENT DOCUMENTS

| | | | |
|---|---|---|---|
| 4,801,887 A | | 1/1989 | Wegener |
| 4,807,102 A | | 2/1989 | Serras-Paulet |
| 4,894,765 A | * | 1/1990 | Kahkipuro .................. 363/124 |
| 6,977,449 B2 | * | 12/2005 | Miettinen ..................... 307/73 |
| 7,026,783 B2 | * | 4/2006 | Eckardt ..................... 318/400.3 |
| 7,035,123 B2 | * | 4/2006 | Schreiber et al. .............. 363/37 |
| 2003/0133314 A1 | | 7/2003 | Hur |
| 2005/0122747 A1 | * | 6/2005 | Gaksch ........................ 363/24 |

FOREIGN PATENT DOCUMENTS

| | | |
|---|---|---|
| DE | 101 35 286 A1 | 2/2003 |
| DE | 101 59 639 A1 | 6/2003 |
| FR | 2 848 034 A1 | 6/2004 |

OTHER PUBLICATIONS

"Fundamental Frequency Front End Converter ($F^3E$)—a DC-link drive converter without electrolytic capacitor", Kurt Göpfrich, Dr. Rebbereh and Dr. Sack, abgedruckt in Tagungsband PCIM 2003, Nürnberg, May 2003.
Matrix Convert Topologies With Reduced Number of Switches, von Lixiang Wei, T.A. Lipo und Ho Chan, abgedruckt in 33rd Proc. Conf. Rec. IEEE PESC, 2002, pp. 57-63, Fig 3.
"Analytically Closed Calculation of the Conduction and Switching Losses of Three-Phase AC-AC Sparse Matris Converters" .F. Schafmeister, M. Baumann and J.W. Kolar, abgedruckt im Tagungsband "EPE 2002 Dubrovnik".

* cited by examiner

*Primary Examiner*—Michael J Sherry
*Assistant Examiner*—Christopher J Clark
(74) *Attorney, Agent, or Firm*—Henry M. Feiereisen; Ursula B. Day

(57) ABSTRACT

A frequency converter includes an intermediate circuit without any capacitors and an electronics which is supplied with power from a power supply device. The power supply device has a buffer capacitor which is disposed on an input side of the power supply device and connected electrically in parallel with the intermediate circuit. Connected to the buffer capacitor is a supply line in which a decoupling diode is disposed. A semiconductor adapted to be switched off is connected electrically back-to-back in parallel with the decoupling diode and has a control output which is connected to an output of an identification device for recognizing a power-line failure.

9 Claims, 4 Drawing Sheets

FREQUENCY CONVERTER HAVING AN INTERMEDIATE CIRCUIT WITHOUT ANY CAPACITORS

CROSS-REFERENCES TO RELATED APPLICATIONS

This application is a continuation of prior filed copending PCT International application no. PCT/EP2005/053502, filed Jul. 20, 2005, which designated the United States and has been published but not in English as International Publication No. WO 2006/015931 and on which priority is claimed under 35 U.S.C. §120, and which claims the priority of German Patent Application, Serial No. 10 2004 035 799.4, filed Jul. 23, 2004, pursuant to 35 U.S.C. 119(a)-(d), the contents of which are incorporated herein by reference in their entirety as if fully set forth herein.

BACKGROUND OF THE INVENTION

The present invention relates, in general, to a frequency converter having an intermediate circuit without any capacitors and having a power supply device for supply of power to the electronics for this converter.

Nothing in the following discussion of the state of the art is to be construed as an admission of prior art.

A frequency converter of a type involved here has a slim intermediate circuit which is slim enough to eliminate the need for an intermediate circuit capacitor. A topology of a frequency converter with intermediate circuit without any capacitors is disclosed in the publication entitled "Fundamental Frequency Front End Converter ($F^3E$)—a DC-link drive converter without electrolyte capacitor", by Kurt Göpfrich, Dr. Rebbereh and Dr. Sack, printed in the Conference Proceedings PCIM 2003, Nürnberg, May 2003, and illustrated in FIG. 2. The $F^3E$ converter has a line-side converter 2 which, in addition to diodes D1 to D6, includes semiconductor switches T1 to T6 which can be switched off and are each connected electrically in parallel with the corresponding diodes D1 to D6. On the input side, the $F^3E$ converter has a line filter 20. In order to ensure that the electronics for this $F^3E$ converter can still be supplied with a supply voltage $U_V$ during brief power-line failures of the feeding mains, a buffered power supply device 12 is provided. It would also be conceivable to provide a power supply connected to the feeding mains. In the event of a power-line failure, the supply voltage $U_V$ at the two output connections would then collapse. Without adequate supply voltage $U_V$, the electronics, and thus the $F^3E$ converter, will switch off.

In conventional frequency converters with a voltage intermediate circuit having at least one electrolytic capacitor as intermediate circuit capacitor, so-called "kinetic buffering (KIP)" is applied for bridging power-line failures. In this way, the drive that includes the frequency converter and the motor reaches its nominal rotation speed very quickly after the power supply has been restored. If no such option is provided in the frequency converter, the drive switches off, resulting in a relatively long restarting time for operation, since not only the signal processing for the frequency converter has to be started up again and reinitialized, but the motor must also be energized again and the rotation speed may have to be determined again.

In the "kinetic buffering" operating mode, when encountering a power-line failure, the drive is operated far enough in the generator range, i.e. braked, so that the mechanical (kinetic) energy of the motor and the connected process machine is able to cover the losses in the motor and the converter. This is realized with the aid of a regulator, which regulates the intermediate circuit voltage to a fixed value, for example 80% of its rated value. The manipulated variable is the torque nominal value or a supplement to the nominal rotational speed value in the case of field-oriented regulation, or a supplement to the frequency nominal value in the case of drives with U/f characteristic control. The voltage supply for the signal processing for the converter is either produced separately from a reliable source, or produced from the DC voltage intermediate circuit. Thus, signal processing and regulation remain active, so that the motor remains excited and is accelerated to its nominal rotation speed again immediately after the line voltage returns.

A precondition for "kinetic buffering" is that the intermediate circuit capacitor in the voltage intermediate circuit of a frequency converter is sufficiently large to enable a buffering of the intermediate circuit currents which occur in one switching period and are different in sign. If this precondition is satisfied, "kinetic buffering" is effective.

In a frequency converter configured as line-side converter having a diode rectifier, the voltage intermediate circuit requires an intermediate circuit capacitor which satisfies the abovementioned precondition.

In converters that have no intermediate circuit capacitors, or only extremely small intermediate circuit capacitors, application of "kinetic buffering" has not been possible. The capacitors which are required for continued operation are either not present or are on the line side in the case of the afore-described converters.

German Offenlegungsschrift DE 101 35 286 A1 discloses a method and an apparatus for bridging brief power-line failures in the case of a matrix converter. The matrix converter, which has a filter on the line side, can be connected to a feeding mains by means of a switch unit. When a power-line failure is detected, the matrix converter is disconnected from the feeding mains without delay and changes to a buffer mode by regulating a determined actual capacitor voltage space vector at a predetermined space vector. When the power is restored, the actual capacitor space vector is synchronized. Once the matrix converter has been synchronized, it is again connected to the feeding mains. The upstream disposition of a switch unit which has to switch very quickly makes it possible to use the capacitors in the line-side filter of the matrix converter as energy storage capacitors for "kinetic buffering" operating mode. As a result of the disconnection of the faulty power supply, these capacitors can be used as energy storage capacitors. Precondition for implementing "kinetic buffering" in a matrix converter is thus the presence of a high-speed line-side switch unit. A further drawback is the complexity of the regulation for line synchronization.

It would therefore be desirable and advantageous to provide an improved frequency converter to obviate prior art shortcomings and to allow use of "kinetic buffering" in a simple and yet reliable manner.

SUMMARY OF THE INVENTION

According to one aspect of the present invention, a frequency converter includes an intermediate circuit without any capacitors, an electronics, a power supply device for supply of power to the electronics, with the power supply device having a buffer capacitor disposed on an input side of the power supply device and connected electrically in parallel with the intermediate circuit, a supply line connected to the buffer capacitor, a decoupling diode disposed in the supply line, a semiconductor adapted to be switched off, with the semiconductor connected electrically back-to-back in parallel with the decoupling diode and having a control output, and an identification device for recognizing a power-line failure, said identification device.

The present invention resolves prior art problems by connecting a semiconductor switch, which can be switched off, electrically back-to-back in parallel with the decoupling diode, so that the buffer capacitor in the power supply device can be used as an energy storage capacitor for "kinetic buffering" in the event of a power-line failure. The semiconductor switch is able to bridge the decoupling diode during the power-line failure, so that a generator current can be maintained during "kinetic buffering". Without this controllable bridging of the decoupling diode, these sections of the motor currents would be masked out (discontinuous current). The result would be a collapse of the magnetization current and thus the motor voltage, followed by a discharge of the buffer capacitor through the power supply device, so that the power supply device would switch off when a predetermined minimum voltage across the buffer capacitor was undershot. When the power supply device switches off, the electronics of the converter is no longer operative. In other words, the electronics and the converter are switched off.

A converter according to the present invention is able to use "kinetic buffering", and it is possible to modify conventional converters in a simple manner for use of "kinetic buffering".

According to another feature of the present invention, the semiconductor and the decoupling diode may be integrated in a semiconductor module.

According to another feature of the present invention, the identification device may be connected on an input side electrically in parallel with the intermediate circuit.

According to another feature of the present invention, the identification device may be linked on an input side to a feeding mains.

According to another feature of the present invention, the semiconductor module may be an insulated gate bipolar transistor module.

According to another feature of the present invention, the frequency converter may be constructed as an $F^3E$ converter, or an indirect matrix converter, or a three-phase AC-AC sparse matrix converter.

BRIEF DESCRIPTION OF THE DRAWING

Other features and advantages of the present invention will be more readily apparent upon reading the following description of currently preferred exemplified embodiments of the invention with reference to the accompanying drawing, in which.

DETAILED DESCRIPTION OF PREFERRED EMBODIMENTS

Figure 1:
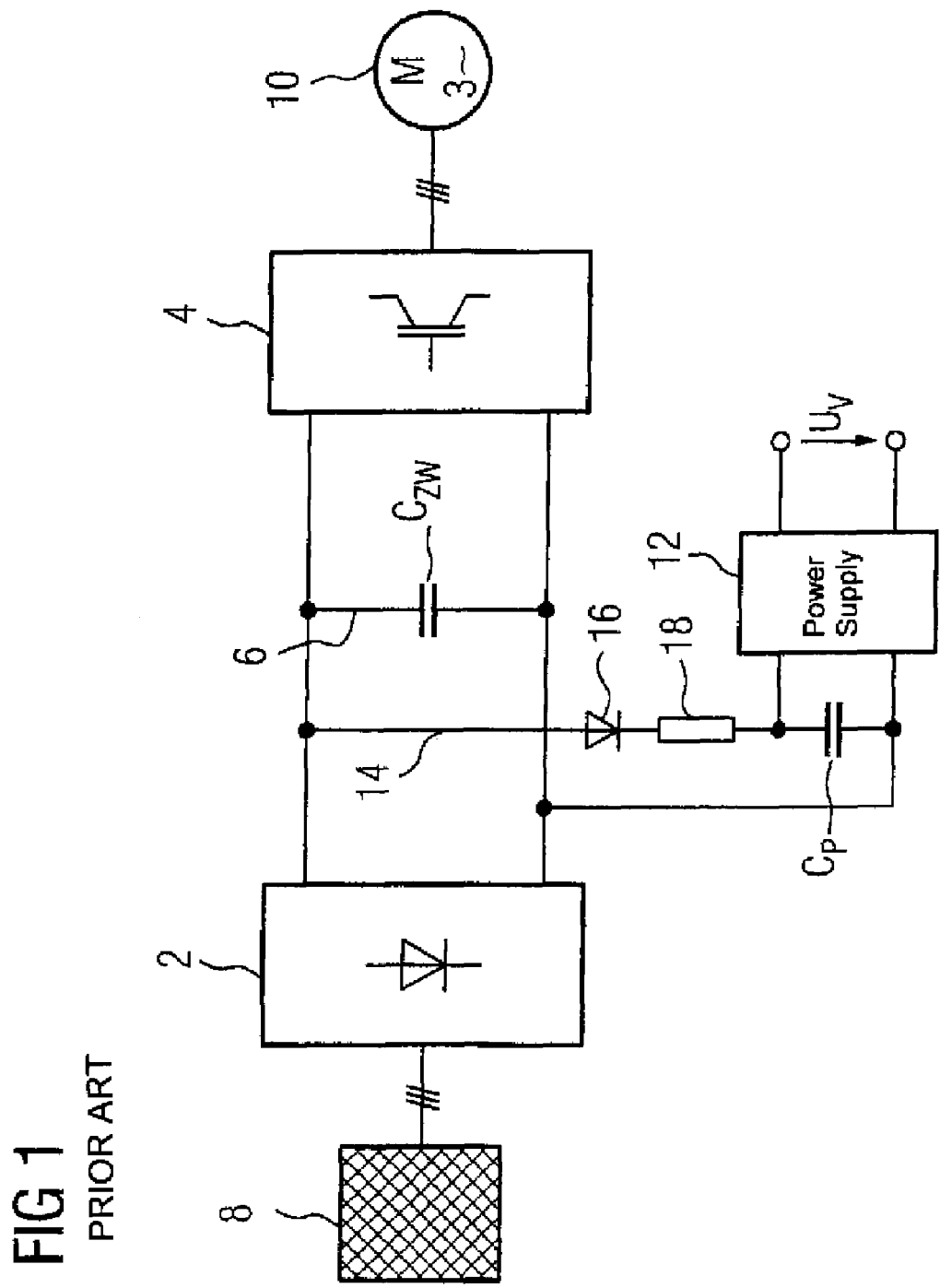
FIG. 1 is a connection diagram of a voltage intermediate-circuit converter.

Throughout all the Figures, same or corresponding elements are generally indicated by same reference numerals. These depicted embodiments are to be understood as illustrative of the invention and not as limiting in any way. It should also be understood that the figures are not necessarily to scale and that the embodiments are sometimes illustrated by graphic symbols, phantom lines, diagrammatic representations and fragmentary views. In certain instances, details which are not necessary for an understanding of the present invention or which render other details difficult to perceive may have been omitted.

Turning now to the drawing, and in particular to FIG. 1, there is shown a basic connection diagram of a voltage intermediate-circuit converter which is fully described in commonly owned German Offenlegungsschrift DE 103 38 476 A1, the entire specification and drawings of which are expressly incorporated herein by reference. The voltage intermediate-circuit converter has a converter 2 on the line side and a converter 4 on the load side. The converters 2, 4 are electrically conductively connected to one another on the DC voltage side by a slim intermediate circuit 6. A diode rectifier is provided as the line-side converter 2, whereas the load-side converter 4 is constructed as a pulse-controlled inverter. The slim intermediate circuit 6 has a foil capacitor as intermediate circuit capacitor $C_{ZK}$. The capacitance of the intermediate circuit capacitor $C_{ZK}$ is reduced considerably in comparison to a voltage intermediate-circuit converter with an electrolytic capacitor as the intermediate circuit capacitor $C_{ZK}$. As a consequence, the intermediate circuit voltage $U_{ZK}$ has a high ripple level, and its mean value is low. This reduced load capacitance considerably reduces the line feedback, even though no additional inductors are required at the input or in the voltage intermediate circuit of the frequency converter. The power supply inputs to the converter are linked to a feeding mains 8 whereas a three-phase motor 10 is connected to the output connections of this converter.

On the input side, a power supply device 12 for supply of power to the electronic system of the voltage intermediate-circuit converter has a buffer capacitor $C_P$. The buffer capacitor $C_P$ is connected electrically in parallel with the slim intermediate circuit 6 and thus electrically in parallel with the intermediate circuit capacitor $C_{ZW}$, with a series circuit comprising a decoupling diode 16 and a current limiting means 18 being connected in a supply line 14 to the buffer capacitor $C_P$. The decoupling diode 16 decouples the two capacitors $C_{ZW}$ and $C_P$ from one another. The current limiting means 18 can be used to set the recharging current for the buffer capacitor $C_p$ to a predetermined value. In the simplest case, the current limiting means 18 is a non-reactive resistor, as a result of which a power loss is incurred across this resistor when a recharging current flows into the buffer capacitor $C_P$. The size of the buffer capacitor $C_P$ depends on the time frame intended to bridge the power-line failure. It is also necessary to take hereby into account the time intervals between such line interruptions in the feeding mains 8.

When a power-line interruption occurs in the feeding mains 8, the intermediate circuit capacitor $C_{ZW}$ and the buffer capacitor $C_P$ are no longer supplied with power. Since the buffer capacitor $C_P$ is decoupled from the intermediate circuit capacitor $C_{ZW}$, it cannot be discharged by the converter load. As a consequence, the stored energy in the buffer capacitor $C_P$ is used solely to maintain the power supply for the electronics for the converter, in particular the load-side converter 4. The voltage intermediate-circuit converter thus remains operative and can again be powered up to its rated operating point when the power supply is restored. Since the intermediate circuit capacitor $C_{ZW}$ has a lower capacitance value, the magnitude of the recharging current is minimal so that the $I^2T$ value of the diodes in the line-side converter 2 need no longer be oversized.

Figure 2:
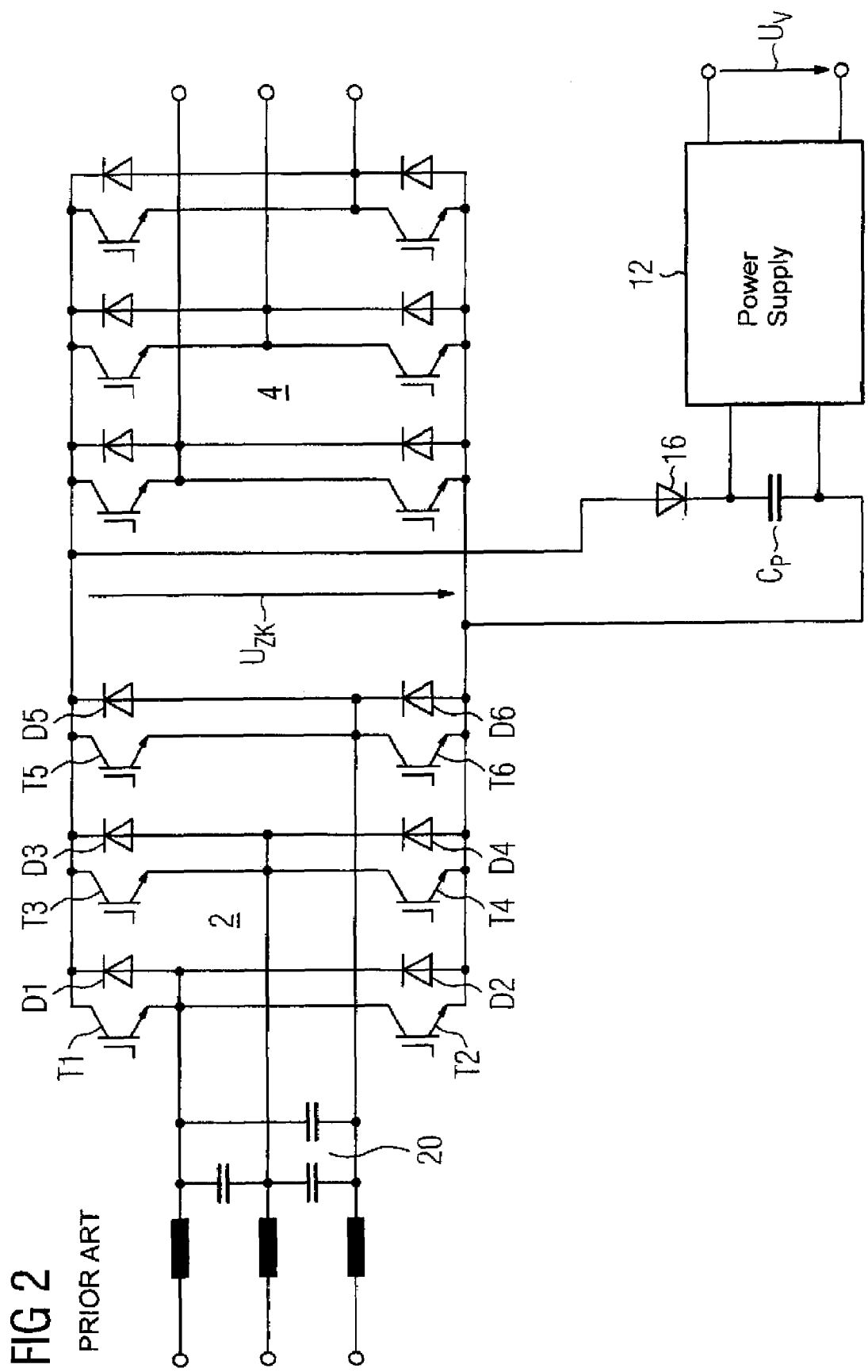
FIG. 2 is a conventional circuit diagram of a frequency converter of the voltage intermediate-circuit converter.
Figure 3:
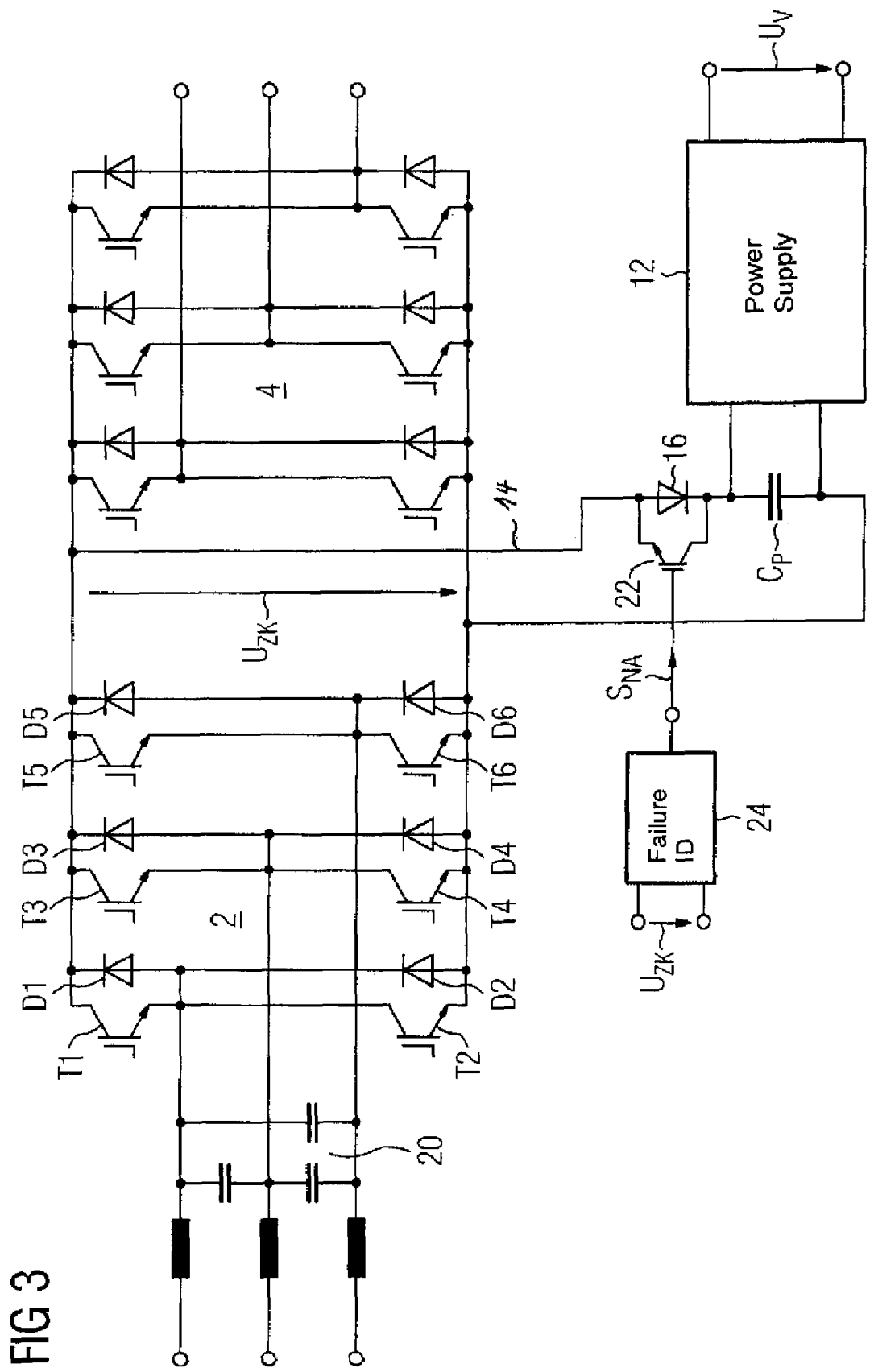
FIG. 3 is a circuit diagram of a voltage intermediate-circuit converter according to the present invention.

Referring now to FIG. 3, there is shown a circuit diagram of a voltage intermediate-circuit converter according to the present invention. Parts corresponding with those in FIG. 2 are denoted by identical reference numerals and not explained again. The description below will center on the differences between these embodiments. In the embodiment of FIG. 3, provision is made for a semiconductor 22, in particular an Insulated Gate Bipolar Transistor (IGBT), which is connected electrically back-to-back in parallel with the decoupling diode 16. On the control side, the semiconductor 22, which can be switched off, is connected to an output of an identification device 24 which recognizes a power-line failure from the intermediate circuit voltage $U_{ZW}$ that is present on the input side. An example of a power-line failure identification device for incorporation into the voltage intermediate-circuit converter of the present invention is fully described in commonly owned German Offenlegungsschrift 10 2004 030 535.8, the entire specification and drawings of which are expressly incorporated herein by reference. The power-line failure identification device 24 may also be connected to the phases of the feeding mains. In this case, the present line-phase voltages are then evaluated. When modifying a conventional converter, as shown in FIG. 2, in accordance with the invention, it is irrelevant how a power-line failure is detected. What is important is only that a power-line failure is detected. When a power-line failure of the feeding mains is detected, a control signal $S_{NA}$ for the controllable semiconductor 22 is produced at the output of the power-line failure identification device 24. This semiconductor signal $S_{NA}$ is used to switch on the semiconductor 22, so that the decoupling diode 16 is bridged. An IGBT module which internally already contains a diode, a so-called inverse diode or freewheeling diode, can be used as the turn-off semiconductor 22. Thus, there is no longer any need for a discrete diode 16, so that there is also no need for a link to the semiconductor 22.

The bridging of the decoupling diode 16 results in a topology which corresponds to that of a conventional frequency converter with intermediate-circuit capacitors. The known "kinetic buffering" option can thus now be implemented. When the line voltage is restored, the control signal $S_{NA}$ changes its level in such a manner that the semiconductor 22 is switched off.

Figure 4:
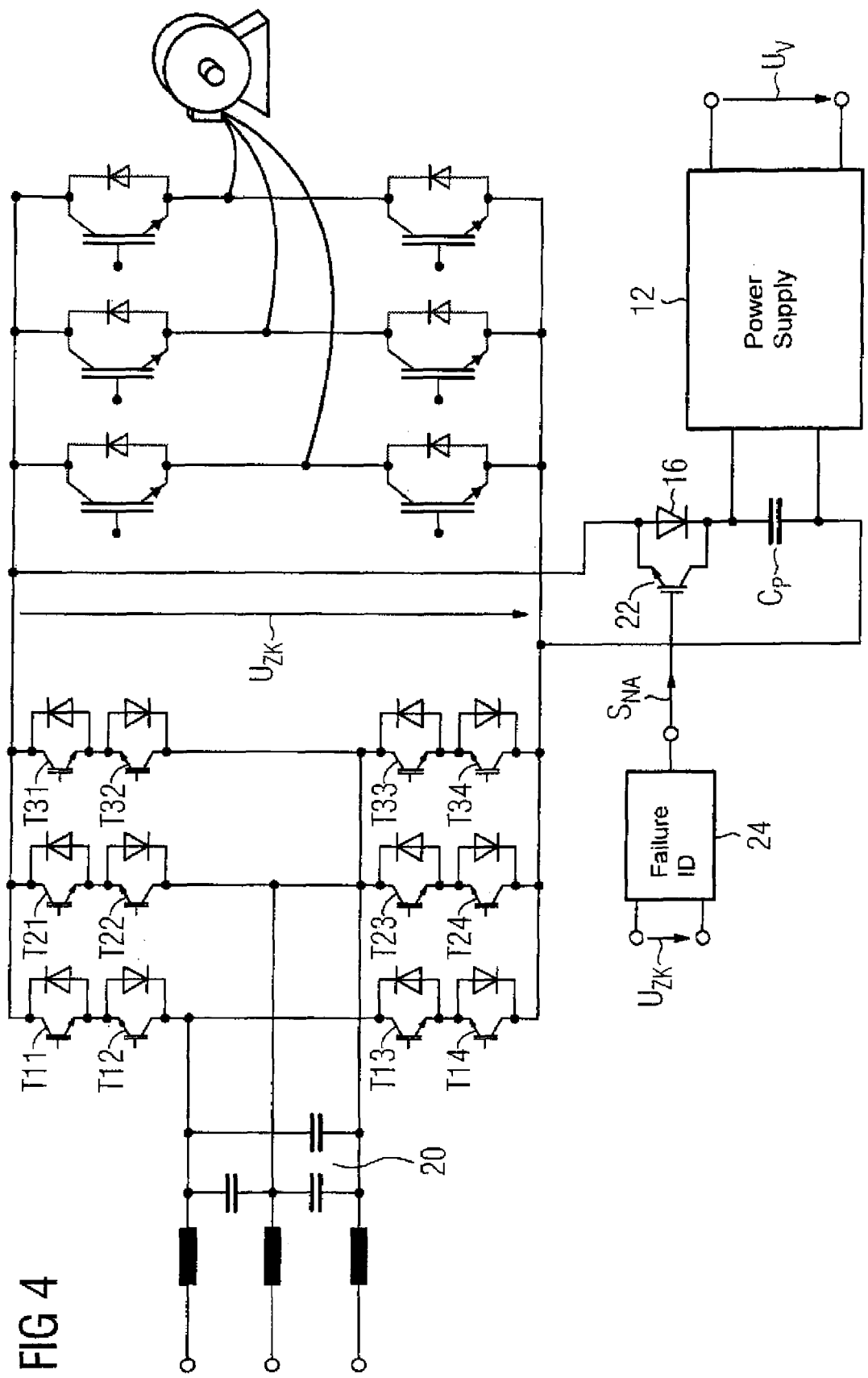
FIG. 4 is a circuit diagram of an AC-AC sparse matrix converter according to the present invention.

The principle according to the invention is also applicable to a so-called indirect matrix converter, as described in the publication entitled "Matrix Convert Topologies With Reduced Number of Switches", by Lixiang Wei, T. A. Lipo and Ho Chan, printed in the 33rd Proc. Conf. Rec. IEEE PESC, 2002, pages 57 to 63, in particular in FIG. 3. Furthermore, also so-called sparse matrix converter, described for example in the publication entitled "Analytically Closed Calculation of the Conduction and Switching Losses of Three-Phase AC-AC Sparse Matrix Converters" by F. Schafmeister, M. Baumann and J. W. Kolar, printed in the Conference Proceedings "EPE 2002 Dubrovnik", can be modified in accordance with the present invention, as will now be described with reference to FIG. 4. Upon identification of a power-line failure, the line-side converter is switched to "diode operation". In other words, the transistors Tx2 and Tx4, wherein x=1, 2, 3, are switched on. The subsequent procedure is the same as that for the voltage intermediate-circuit converter as shown in FIG. 3. After the line voltage is restored, the semiconductor 22 is switched off again. A zero pointer can be advantageously switched inside the load-side converter for this purpose in a manner known in the art. This indirect matrix converter is then once again ready for normal operation.

In accordance with the present invention, a frequency converter having an intermediate circuit without any capacitors can be modified in a simple manner for application of "kinetic buffering" so as to benefit from the advantages of the "kinetic buffering" option.

While the invention has been illustrated and described in connection with currently preferred embodiments shown and described in detail, it is not intended to be limited to the details shown since various modifications and structural changes may be made without departing in any way from the spirit of the present invention. The embodiments were chosen and described in order to best explain the principles of the invention and practical application to thereby enable a person skilled in the art to best utilize the invention and various embodiments with various modifications as are suited to the particular use contemplated.

What is claimed as new and desired to be protected by Letters Patent is set forth in the appended claims and includes equivalents of the elements recited therein:

1. A frequency converter, comprising:
   an intermediate circuit without any capacitors;
   an electronics circuit;
   a power supply device for supply of power to the electronics circuit, said power supply device having a buffer capacitor disposed on an input side of the power supply device and connected electrically in parallel with the intermediate circuit;
   a supply line connected to the buffer capacitor;
   a decoupling diode disposed in the supply line;
   a semiconductor adapted to be switched off, said semiconductor connected electrically back-to-back in parallel with the decoupling diode and having a control input; and
   an identification device for recognizing a power-line failure, said identification device having an output connected to the control input of the semiconductor.

2. The frequency converter of claim 1, wherein the semiconductor and the decoupling diode are integrated in a semiconductor module.

3. The frequency converter of claim 1, wherein the identification device is connected on an input side electrically in parallel with the intermediate circuit.

4. The frequency converter of claim 1, wherein the identification device is linked on an input side to a feeding mains.

5. The frequency converter of claim 2, wherein the semiconductor module is an insulated gate bipolar transistor module.

6. The frequency converter of claim 1, constructed as an $F^3E$ converter.

7. The frequency converter of claim 1, constructed as an indirect matrix converter.

8. The frequency converter of claim 1, constructed as a three-phase AC-AC sparse matrix converter.

9. The frequency converter of claim 1, further comprising a load converter having a zero pointer, said zero pointer being adapted to cause the semiconductor to be switched off, when a power-line failure is removed.

* * * * *